US012689470B2

(12) United States Patent
Laselva et al.

(10) Patent No.: US 12,689,470 B2
(45) Date of Patent: Jul. 21, 2026

(54) MANAGING PACKET DUPLICATION

(71) Applicant: NOKIA TECHNOLOGIES OY,
Espoo (FI)

(72) Inventors: Daniela Laselva, Klarup (DK); **Klaus
Ingemann Pedersen**, Aalborg (DK)

(73) Assignee: Nokia Technologies Oy, Espoo (FI)

( * ) Notice: Subject to any disclaimer, the term of this
patent is extended or adjusted under 35
U.S.C. 154(b) by 0 days.

(21) Appl. No.: 17/309,226

(22) PCT Filed: Oct. 30, 2019

(86) PCT No.: PCT/EP2019/079630
§ 371 (c)(1),
(2) Date: May 7, 2021

(87) PCT Pub. No.: WO2020/094472
PCT Pub. Date: May 14, 2020

(65) Prior Publication Data
US 2021/0392090 A1 Dec. 16, 2021

Related U.S. Application Data

(60) Provisional application No. 62/758,192, filed on Nov.
9, 2018.

(51) Int. Cl.
*H04L 1/08* (2006.01)
*H04L 47/32* (2022.01)
(Continued)

(52) U.S. Cl.
CPC ............... *H04L 1/08* (2013.01); *H04L 47/32*
(2013.01); *H04L 49/90* (2013.01); ***H04W
28/02*** (2013.01)

(58) Field of Classification Search
CPC ......... H04L 49/90; H04L 47/32; H04W 28/02
See application file for complete search history.

(56) References Cited

U.S. PATENT DOCUMENTS

2010/0274921 A1* 10/2010 Lerzer ..................... H04L 69/12
709/234
2018/0270792 A1* 9/2018 Park ................... H04W 68/025
(Continued)

FOREIGN PATENT DOCUMENTS

CA 3082722 A1 * 5/2019 ............... H04L 1/08
CN 201444641 U 4/2010
(Continued)

OTHER PUBLICATIONS

International Search Report and Written Opinion for International
Application No. PCT/EP2019/079630, mailed on Jan. 17, 2020, 12
pages.
(Continued)

*Primary Examiner* — Siming Liu
(74) *Attorney, Agent, or Firm* — Brake Hughes
Bellermann LLP

(57) ABSTRACT

A method for managing uplink packet duplication at an user
equipment is described. The example method includes
receiving, an indication from a network node, the indication
instructing the user equipment (UE) to discard protocol data
units (PDUs) that are buffered at one or more associated
protocol entities at the user equipment (UE). The method
further includes discarding, in response to receiving the
indication, the protocol data units (PDUs) that are buffered
at the one or more associated protocol entities.

17 Claims, 6 Drawing Sheets

(51) Int. Cl.
_H04L 49/90_ (2022.01)
_H04W 28/02_ (2009.01)

(56) References Cited

U.S. PATENT DOCUMENTS

| | | | |
|---|---|---|---|
| 2018/0309660 A1 | 10/2018 | Loehr et al. | |
| 2018/0310202 A1* | 10/2018 | Löhr | H04W 76/27 |
| 2018/0332501 A1* | 11/2018 | Tseng | H04L 1/08 |
| 2019/0327641 A1* | 10/2019 | Mok | H04W 24/10 |
| 2020/0059867 A1* | 2/2020 | Haghighat | H04W 52/42 |
| 2020/0119864 A1* | 4/2020 | Xu | H04L 1/1858 |
| 2020/0305186 A1* | 9/2020 | Alfarhan | H04W 80/08 |
| 2020/0358558 A1* | 11/2020 | Tang | H04L 5/006 |

FOREIGN PATENT DOCUMENTS

| | | |
|---|---|---|
| CN | 101965705 A | 2/2011 |
| CN | 103392372 A | 11/2013 |
| CN | 104272796 A | 1/2015 |
| CN | 105493554 A | 4/2016 |
| CN | 106470439 A | 3/2017 |

OTHER PUBLICATIONS

3GPP TSG-RAN WG2 Meeting #104, R2-1817429; "Clarification of Primary and Secondary RLC Entity"; Agenda Item: 9.15.2; Source: Huawei, HiSilicon; Spokane, Washington, USA; Nov. 12-16, 2018; 4 pages.

3GPP TSG-RAN WG3 #101bis, R3-185556; "Higher Layer Multi-Connectivity"; Agenda Item: 21.2.3; Source: CATT; Chengdu, China; Oct. 8-12, 2018; 6 pages.

3GPP TSG_RAN3 Meeting #102, R3-186971; "Resource Efficient PDCP Duplication"; Agenda Item: 21.2.1; Source: Huawei; Spokane, Washington, USA; Nov. 12-16, 2018; 2 pages.

First Examination Report for India Application No. 202147024877, mailed on Feb. 24, 2022, 7 pages.

Office Action for European Application No. 19797653.3, mailed on Feb. 13, 2023, 5 pages.

Office Action and Search Report for Chinese Patent Application No. 201980088439.5, mailed on Nov. 30, 2023, 12 pages.

Song et al.; Research and Design of PDCP Layer in LTE Protocol Stack; Journal of Chongqing University of Posts and Telecommunications (Natural Science Edition); vol. 23; No. 1; Feb. 2011; 5 pages.

Office Action for Chinese Patent Application No. 201980088439.5, mailed on Sep. 26, 2024, 13 pages.

Office Action and Search Report for Chinese Patent Application No. 201980088439.5, mailed on Jul. 12, 2024, 13 pages.

Communication under Rule 71(3) EPC for European Patent Application No. 19797653.3, mailed on May 26, 2025, 34 pages.

Office Action for Chinese Patent Application No. 201980088439.5, mailed on Dec. 10, 2024, 11 pages (including translation).

* cited by examiner

Example Wireless Network 130

MgNB 202

SgNB 204

UE 206

MAC CE Duplication Activation 212

UE configured with DC/CA based PDCP PDU Duplication 214

Packet Data 216A

Packet Data 216B

DCI (with UL Grant with discard indication) 218

UE configured to discard duplicate PDCP PDUs 220

Packet Data 222A

Packet Data 222B

DCI (with UL Grant and without discard indication) 224

UE configured to transmit duplicate PDCP PDUs 226

Packet Data 228A

Packet Data 228B

200

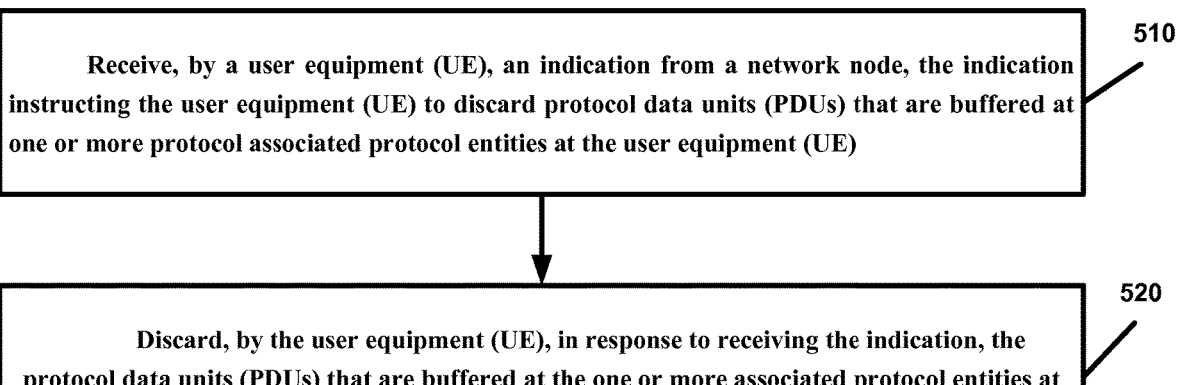

Receive, by a user equipment (UE), an indication from a network node, the indication instructing the user equipment (UE) to discard protocol data units (PDUs) that are buffered at one or more protocol associated protocol entities at the user equipment (UE)          510

Discard, by the user equipment (UE), in response to receiving the indication, the protocol data units (PDUs) that are buffered at the one or more associated protocol entities at the user equipment (UE)          520

FIG. 5

MANAGING PACKET DUPLICATION

CROSS-REFERENCE TO RELATED APPLICATIONS

This application is a national stage entry of International Application No. PCT/EP2019/079630, filed Oct. 30, 2019, entitled "MANAGING PACKET DUPLICATION" which claims the benefit of priority of U.S. Provisional Application No. 62/758,192, filed Nov. 9, 2018, both of which are hereby incorporated by reference in their entireties.

TECHNICAL FIELD

This description relates to wireless communications, and in particular, to duplication of data for ultra-reliable and low-latency communications (URLLC) communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency.

SUMMARY

According to an example implementation, a method, apparatus, and a computer-readable storage medium are provided for managing uplink packet detection at a user equipment. In some implementations, for example, the example method may include receiving, an indication from a network node, the indication instructing the user equipment (UE) to discard protocol data units (PDUs) that are buffered at one or more associated protocol entities at the user equipment (UE). The method further includes discarding, in response to receiving the indication, the protocol data units (PDUs) that are buffered at the one or more associated protocol entities.

The details of one or more examples of implementations are set forth in the accompanying drawings and the description below. Other features will be apparent from the description and drawings, and from the claims.

BRIEF DESCRIPTION OF THE DRAWINGS

FIG. 5 is a flow chart illustrating packet duplication at a user equipment, according to an example implementation.

DETAILED DESCRIPTION

Figure 1:
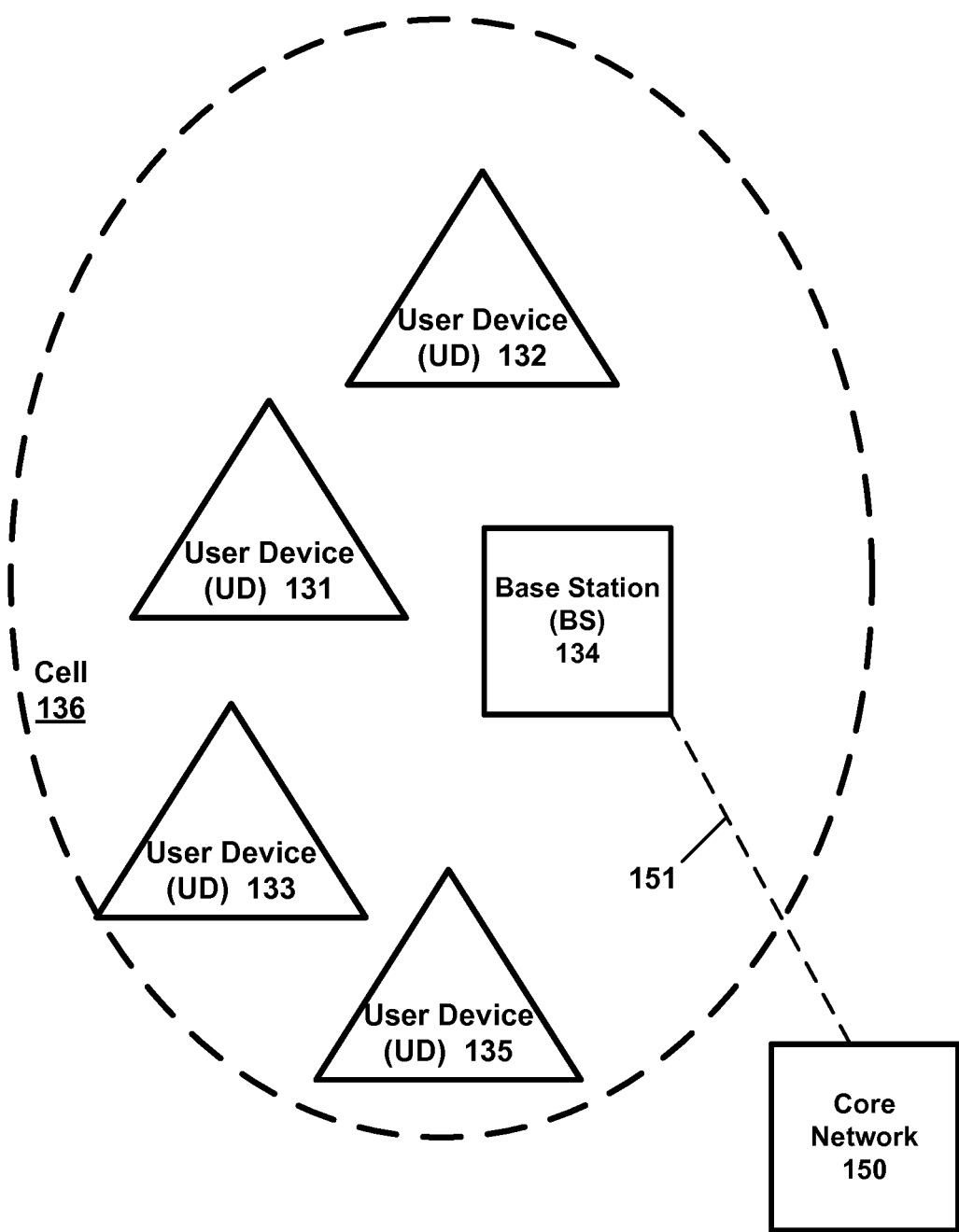
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC or machine to machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of 10-5 and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example implementations may be applied to a wide variety of wireless technologies or wireless networks, such as LTE, LTE-A, 5G, IoT, MTC, eMTC, eMBB, URLLC, etc., or any other wireless network or wireless technology. These example networks, technologies or data service types are provided only as illustrative examples.

Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMIO, or MU-MIMO) enhances MIMO technology by allowing a base station (BS) or other wireless node to simultaneously transmit multiple streams to different user devices or UEs, which may include simultaneously transmitting a first stream to a first UE, and a second stream to a second UE, via a same (or common or shared) set of physical resource blocks (PRBs) (e.g., where each PRB may include a set of time-frequency resources).

Also, a BS may use precoding to transmit data to a UE (based on a precoder matrix or precoder vector for the UE).

For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix may be determined, e.g., where the UE may receive reference signals from the BS, determine a channel estimate of the DL channel, and then determine a decoder matrix for the DL channel based on the DL channel estimate. For example, a precoder matrix may indicate antenna weights (e.g., an amplitude/gain and phase for each weight) to be applied to an antenna array of a transmitting wireless device. Likewise, a decoder matrix may indicate antenna weights (e.g., an amplitude/gain and phase for each weight) to be applied to an antenna array of a receiving wireless device.

For example, according to an example aspect, a receiving wireless user device may determine a precoder matrix using Interference Rejection Combining (IRC) in which the user device may receive reference signals (or other signals) from a number of BSs (e.g., and may measure a signal strength, signal power, or other signal parameter for a signal received from each BS), and may generate a decoder matrix that may suppress or reduce signals from one or more interferers (or interfering cells or BSs), e.g., by providing a null (or very low antenna gain) in the direction of the interfering signal, in order to increase a signal-to interference plus noise ratio (SINR) of a desired signal. In order to reduce the overall interference from a number of different interferers, a receiver may use, for example, a Linear Minimum Mean Square Error Interference Rejection Combining (LMMSE-IRC) receiver to determine a decoding matrix. The IRC receiver and LMMSE-IRC receiver are merely examples, and other types of receivers or techniques may be used to determine a decoder matrix. After the decoder matrix has been determined, the receiving UE/user device may apply antenna weights (e.g., each antenna weight including an amplitude and a phase) to a plurality of antennas at the receiving UE or device based on the decoder matrix. Similarly, a precoder matrix may include antenna weights that may be applied to antennas of a transmitting wireless device or node.

In NR Rel-15, data from a user equipment (UE) can be duplicated at a packet data convergence protocol (PDCP) sublayer and transmitted over to, for example, two cell groups (CGs) based on dual connectivity (DC) configuration or different component carriers (CCs) within a cell group (CG) based on carrier aggregation (CA). This allows duplicated data to be transmitted via two independent air interface paths by exploiting diversity gains to enhance reliability while also reducing latency associated with potential HARQ/ARQ re-transmissions.

It is therefore desirable to reduce the number of PDUs being duplicated and transmitted to improve resource efficiency and/or network performance, in both downlink and uplink directions.

In an uplink aspect, the PDU duplication may be activated on a per data radio bearer (DRB) basis via a media access control (MAC) control element (CE) from a gNB (e.g., MgNB or SgNB). However, due to the delays associated with the activation/deactivation (e.g., procedure is slow), it could be beneficial if the PDU duplication is managed (e.g., controlled) in a faster and/or more efficient manner.

The present disclosure provides a simple, efficient, and faster network based control of PDCP PDU duplication based on dynamic grant information. This is especially useful in cases where the traffic profile is not known or not predictable (i.e. irregular profile). The present disclosure proposes an enhanced (improved) mechanism for managing packet duplication at an user equipment. In one example implementation, the method includes receiving an indication from a gNB. The indication instructs the user equipment (UE) to discard protocol data units (PDUs) that are buffered at one or more associated protocol entities at the user equipment (UE). The example implementation further includes discarding the protocol data units (PDUs) that are buffered at the one or more associated protocol entities in response to receiving the indication.

Figure 2:
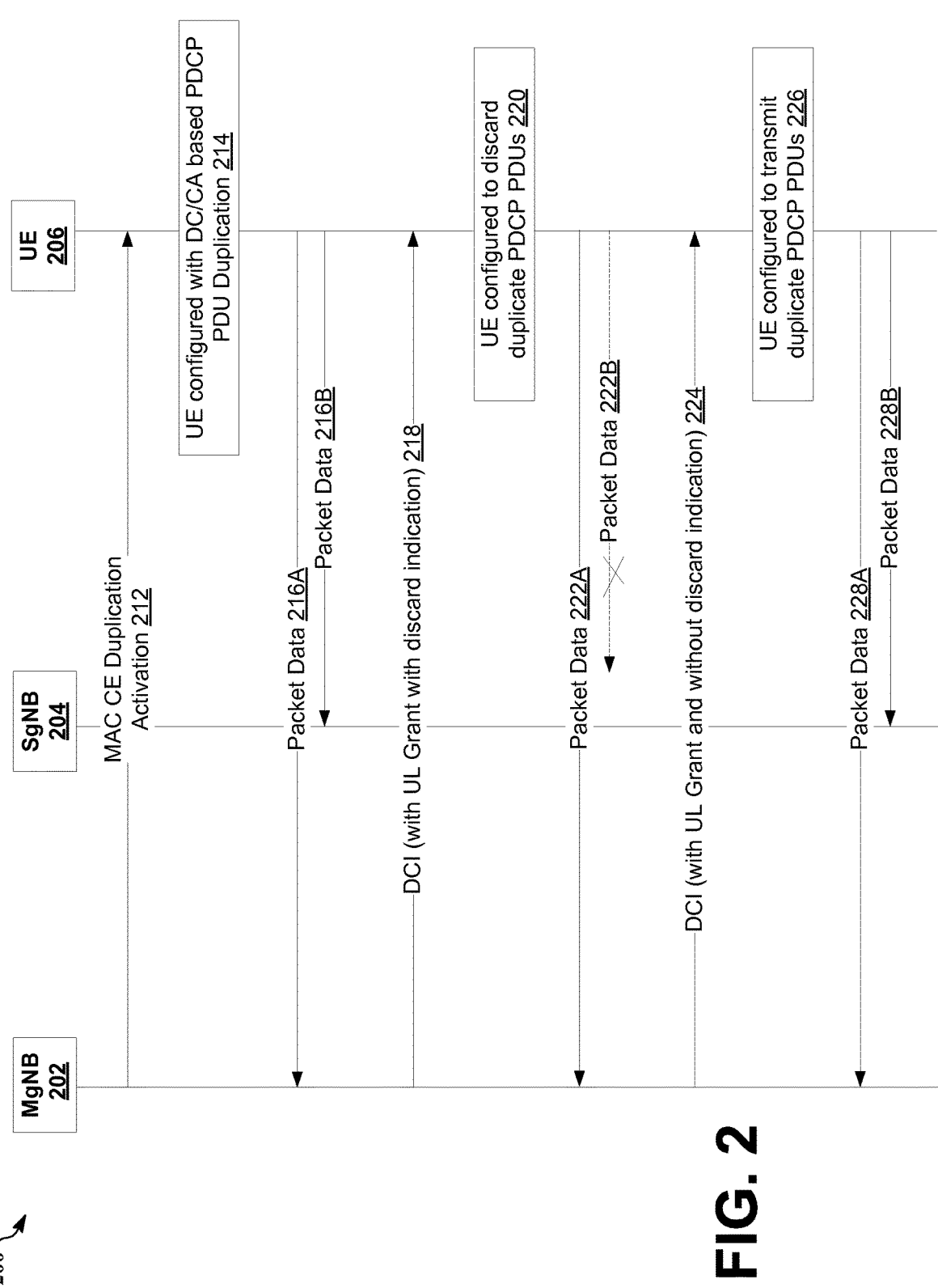
FIG. 2 illustrates a sequence diagram for managing uplink packet duplication, according to one example implementation.

FIG. 2 is a sequence diagram 200 illustrating the managing of uplink packet duplication, according to one example implementation.

At 212, a gNB 202 (e.g., a MgNB) may activate PDU duplication at a user equipment (UE) 206. The MgNB 202 may activate PDU duplication via a media access control (MAC) control element (CE) which may include a bitmap corresponding to data radio bearers (DRBs) configured with duplication. The mapping between DRBs and the MAC CE bitmap is based on order of DRB ID(s) of the DRB(s) configured with duplication. Additional details may be found in 3GPP TS 38.321 Specification. In some implementations, the SgNB 204 may activate PDU duplication at the UE 206 via a MAC CE. However, in some implementations, the PDU duplication may be activated/deactivated using downlink control information (DCI) transmitted to a UE, as described in this disclosure.

The present disclosure describes the improved duplication mechanism using PDCP PDUs as an example. The improved PDU duplication mechanism can be used for any type of PDUs, for example, MAC PDUs, RLC PDUs, SDAP PDUs, etc. and may be used for duplicating PDUs at a UE for uplink communications or duplicating PDUs at a gNB for downlink communications.

In some implementations, the UE 206 may be in a dual connectivity (DC) configuration with MgNB 202 and SgNB 204 to support PDU duplication at the UE 206. In some implementations, the UE 206 may be configured with carrier aggregation (CA) configuration with the MgNB 202 being one component carrier (CC) and the SgNB 205 being another CC to support PDU duplication at the UE 206. In some implementations, the PDU duplication may be based on new radio (NR) dual connectivity (DC), new radio (NR) carrier aggregation (CA), long term evolution (LTE) dual connectivity, E-UTRA-NR Dual connectivity, or any other form of DC or CA, as defined in 3GPP standards.

At 214, in response to the activation of the PDU duplication via the MAC CE, the PDU duplication is activated at the UE 206, for example, by activating data radio bearer (DRB) duplication. This allows (or enables) the UE 206 to duplicate the PDUs for each of the radio link control (RLC) entities at the UE 206 for transmission to the corresponding RLC entities of the network nodes. For example, in some implementations, the RLC entities may be associated with MgNB 202 and SgNB 204.

Figure 3:
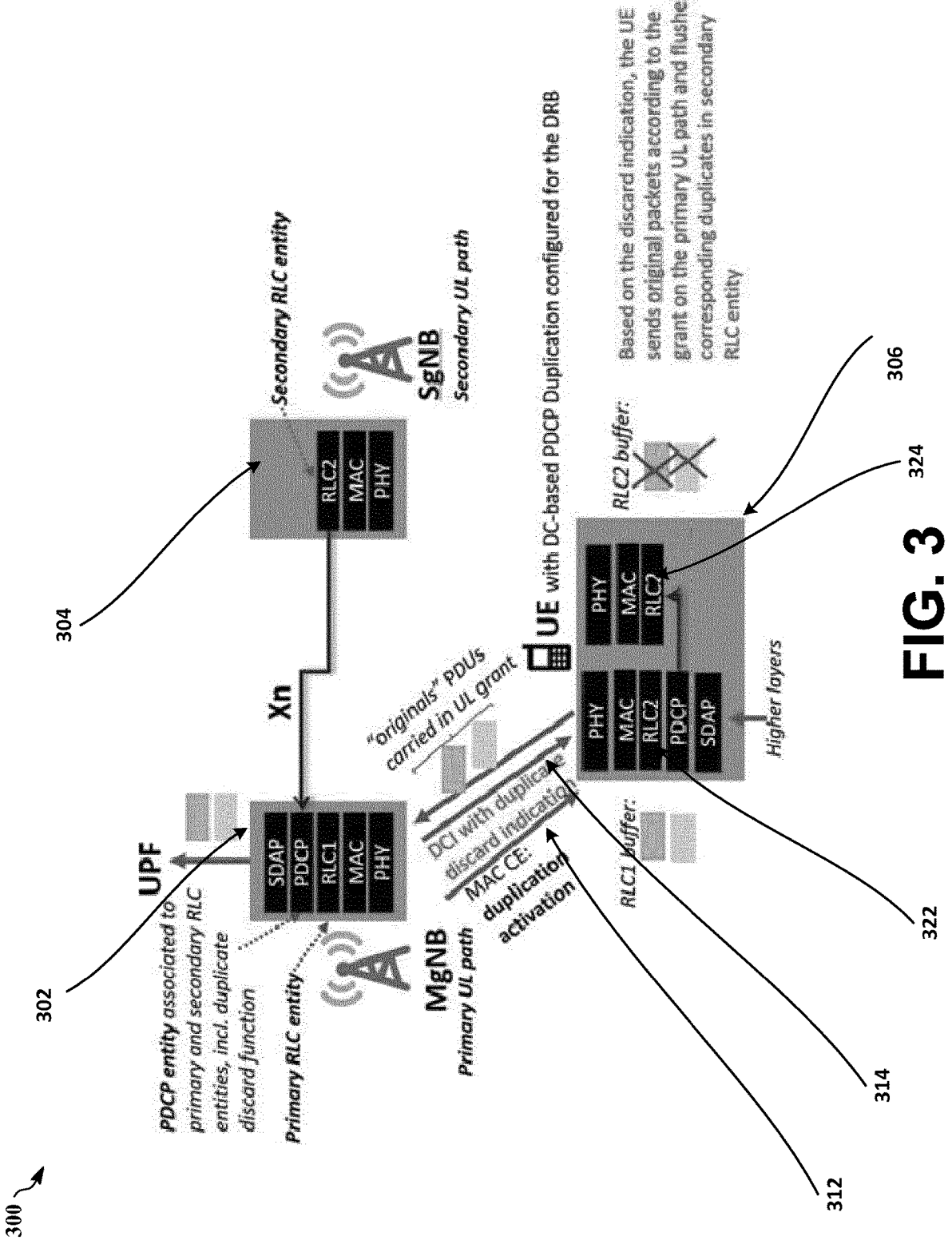
FIG. 3 illustrates a block diagram for managing packet duplication at an user equipment with dual connectivity, according to at least one example implementation.
Figure 4:
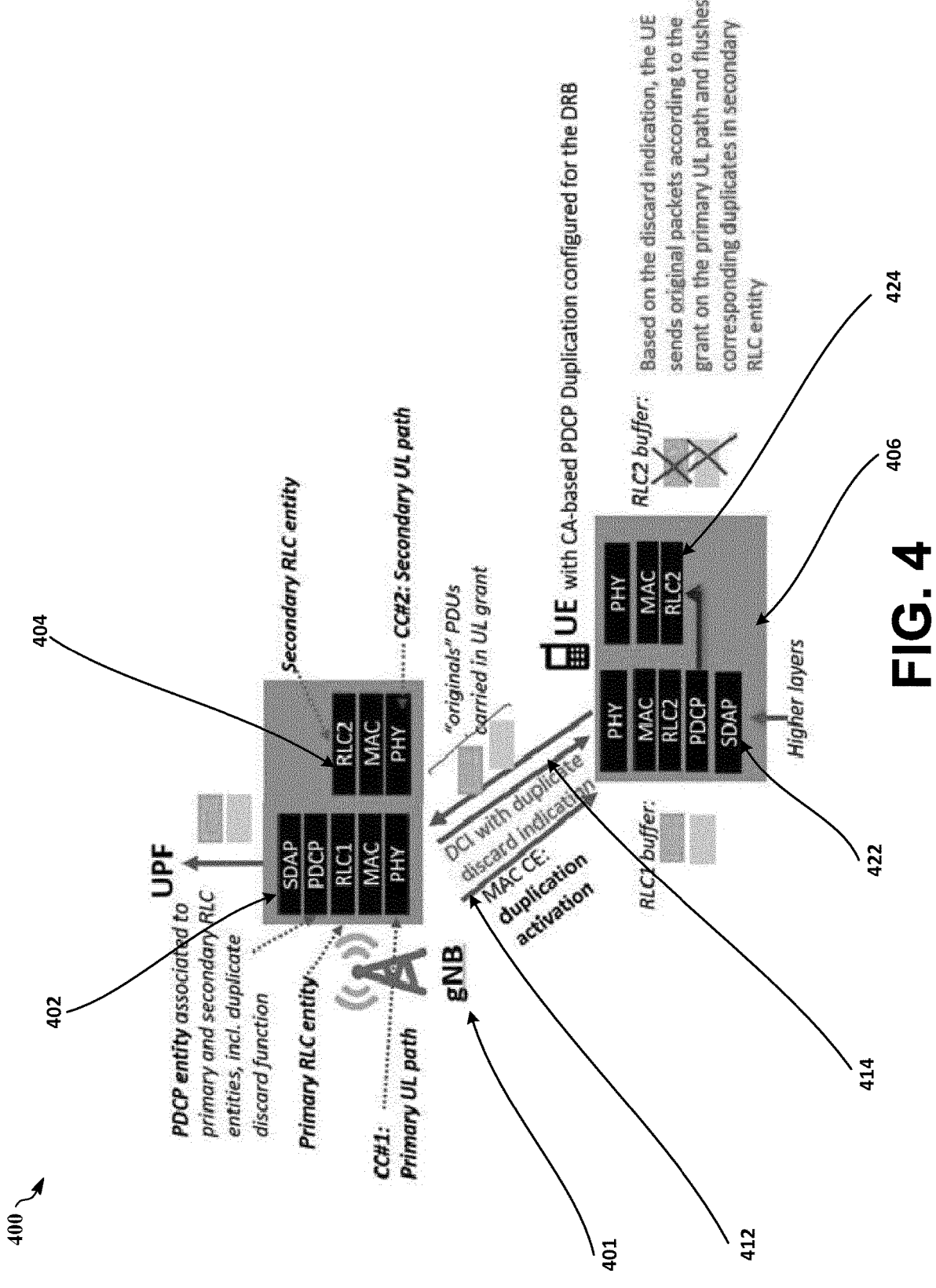
FIG. 4 illustrates a block diagram for managing packet duplication at an user equipment with carrier aggregation, according to at least one example implementation.

In some implementations, after the DRB (or PDU) duplication is activated, the UE 206 duplicates the PDUs and places two identical copies in the two associated RLC entities as illustrated in reference to FIGS. 3 and 4. One RLC entity is associated with the MgNB 202 and the other RLC entity is associated with the SgNB 204.

At 216A, the RLC entity at the UE 206 corresponding to the MgNB 202 transmits the PDUs to the MgNB 202. Similarly, at 216B, the RLC entity at the UE 206 corresponding to the SgNB 204 transmits the PDUs to the SgNB 204. In other words, the PDUs are duplicated at the UE 206 and transmitted to MgNB 202 and SgNB 204.

At 218, in one implementation, the MgNB 202 may send a downlink control information (DCI) to the UE 206. In addition to the uplink grant information that is generally conveyed by DCI to the UE 206, the DCI may also include an indication which may instruct the UE 206 to discard duplicate PDUs. In some implementations, the SgNB 204 may send a DCI to the UE 206. In some implementations, for example, the SgNB 204 can schedule the UE 206 by sending DCI with discard indication, and thus the UE 206 will only send the PDUs to the SgNB 204, while discarding the duplicated PDUs to the MgNB 202. However, for carrier aggregation (CA) configurations, cross-carrier scheduling is possible. In such cross-carrier scheduling configurations, the UE 206 could be scheduled from carrier #1 with DCI instructing the UE to discard duplicated PDUs for carrier #1, but to send the PDUs on carrier #2; i.e. corresponding case where DCI sent from carrier #1 grants uplink allocation for the UE on carrier #2.

For example, in some implementations, the MgNB 202 may send the discard indication to the UE 206 via the DCI when the MgNB 202 determines that the transmission conditions from the UE 206 are optimal (e.g., based on signal/link quality measurements, etc.) and that the PDUs from the UE 206 will be reliably transmitted to the MgNB 202 without the need for another independent air interface path. In other words, when the MgNB 202 determines that PDU duplication is not needed (e.g. at least temporarily), the MgNB 202 may send the discard indication via the DCI to temporarily suspend the PDU duplication. The discard indication temporarily suspends PDU duplication (e.g., dynamically) but may not deactivate the PDU duplication at the UE 206. In some implementations, the DCI may be also used to activate/deactivate PDU duplication at the UE 206 as this is faster than using MAC CE.

In some implementations, the MgNB 202 may schedule the UE 206 to transmit N PDUs in the UL, for example, using DCI with the discard indication. The UE 206, upon receiving the DCI with the discard indication, the UE 206 discards only the N PDUs that are duplicated and buffered. In some implementations, all buffered PDUs may be discarded if more than N PDUs are buffered.

At 220, the UE 206 is configured to discard the duplicate PDUs intended for the SgNB. For example, the UE 206 is configured to discard the duplicate PDUs at the RLC associated with the SgNB 204. In some implementations, the UE 206 may be configured to discard duplicate PDUs intended for the MgNB 202 and the discard indication may come from the SgNB 204.

At 222A, the RLC entity at the UE 206 associated with the MgNB 202 transmits the PDUs to the MgNB 202 (e.g., to the associated radio link entity at the MgNB 202), for example, similar to 216A. At 222B, however, the RLC entity at the UE 206 corresponding to the SgNB 204 may discard the PDUs intended for the SgNB 204. The discarding of PDUs may include flushing PDUs that are buffered (or clearing the buffer) at the associated RLC entity at UE 206 intended for transmission to the SgNB 204 or storing the buffered PDUs for later transmission to the SgNB 204, for example, where the duplicated PDUs are transmitted if the first transmission fails.

In some implementations, the UE 206 may discard the PDUs associated with the uplink grant received via the DCI. For example, the UE 206 may discard PDUs buffered at the associated RLC entity (e.g., RLC entity at the UE 206 associated with the SgNB 204) based on the PDUs being transmitted to the MgNB 202 using the UL grant received via the DCI.

In some implementations, a 1:1 or N:1 mapping may exist between PDUs (e.g., PDCP PDUs) and transport blocks (TBs), with N being a non-zero positive integer. The mapping may be between PDUs of PDCP, RLC, and MAC and transport blocks (TBs). In some implementations, with N:1 mapping, all the PDUs included in a TB associated with the corresponding uplink grant included in the DCI are discarded. In other words, all the PDUs included in a transport block using the uplink grant indicated in the DCI (which included the discard indicator) are discarded. For instance, this may be possible as the UE 206 keeps tracks of the PDUs and the mapping information.

In some implementations, at 224, the MgNB 202 may send DCI to the UE 206. In addition to the uplink grant information that is generally conveyed by the DCI to the UE 206, the DCI being sent at 224 may also include an indication not to discard duplicate PDUs. In other words, the MgNB 202 may instruct the UE 206 to resume PDU duplication. In some implementations, the MgNB 202 may instruct the UE 206 to resume PDU duplication if the MgNB 202 detects deteriorating uplink conditions. At 226, the UE 206 is configured to stop discarding duplicate PDUs and resume PDU duplication, similar to packet duplication configured at 214.

At 228A, the RLC entity at UE 206 corresponding to the MgNB 202 continues to transmit PDUs to the MgNB 202. In addition, at 228B, similar to 216B, the RLC entity at the UE 206 corresponding to the SgNB 204 resumes transmitting PDUs to the SgNB 204. In other words, the transmission of the duplicated PDUs resumes and the UE 206 starts transmitting PDUs via two air-interface paths.

In some implementations, when the UE 206 resumes PDU duplication, SgNB 204 should provide resources to the user equipment (UE) 206 to provide the duplicate packets to the SgNB 204. To support this, the uplink resources for transmissions to the SgNB 204 are pre-configured at the UE 206. This includes the UE 206 being aware of the resources to use and the direction of the resources based on the resource pre-configuration information (also referred to as configured grant (e.g., grant free transmissions in NR). In some-implementations, the indication (e.g., to not discard) may activate the configured grants associated with the SgNB 204.

Thus, the transmission of duplicate PDUs can be managed at the UE to improve resource efficiency and/or network performance.

FIG. 3 illustrates a block diagram 300 of managing packet duplication at an user equipment (UE) with dual connectivity (DC), according to at least one example implementation.

In FIG. 3, a MgNB 302, a SgNB 304, and a UE 306 are shown. The MgNB 302, SgNB 304, and UE 306 may be same or similar to MgNB 202, SgNB 204, and/or UE 206 of FIG. 2.

For example, UE 306 may be configured with DC to MgNB 302 and SgNB 304. As such, MgNB 302 or SgNB 304 can activate/deactivate (312) DRB duplication at UE 306 via MAC CE 312. In response to DRB duplication being activated, the UE 306 duplicates the PDUs (e.g., PDCP PDUs) and places (e.g., saves) two identical copies of the PDUs in the two associated RLC entities, a RLC entity 322 associated with MgNB 302 and another RLC entity 324 associated with the SgNB 304.

In some implementations, the MgNB 302 (or SgNB 304) can instruct the UE 306 to discard duplicate PDUs via a DCI 314 as described in reference to FIG. 2. In some implementations, the MgNB 302 (or SgNB 304) may activate/deactivate PDU duplication via DCI 314.

FIG. 4 illustrates a block diagram 400 of managing packet duplication at an user equipment (UE) configured with carrier aggregation (CA), according to at least one example implementation.

In FIG. 4, a UE 406 may be configured with carrier aggregation, e.g., with at least two component carriers, e.g., a primary component carrier 402 (which may be MgNB 402) and at least one secondary component carrier 404 (which may be SgNB 404). The uplink from the UE 406 to the MgNB 402 may be considered as the primary uplink and the uplink from the UE 406 to the CC 404 may be considered as the secondary uplink.

For example, UE 406 may be configured with CA. As such, MgNB 402 or SgNB 304 can activate/deactivate DRB duplication at UE 406 via MAC CE 412. In response to DRB duplication being activated, the UE 406 duplicates the PDUs (e.g., PDCP PDUs) and places (e.g., saves) two identical copies of the PDUs in the two associated RLC entities, a RLC entity 422 associated with MgNB 402 and another RLC entity 424 associated with the SgNB 404.

In some implementations, the MgNB 402 (or SgNB 404) can instruct the UE 406 to discard duplicate PDUs via a DCI 414 as described in reference to FIG. 2. In some implementations, the MgNB 402 (or SgNB 404) may activate/deactivate PDU duplication via DCI 414.

FIG. 5 is a flow chart 500 illustrating managing uplink packet duplication at a user equipment (UE).

At block 510, a user equipment (UE) may receive an indication from a network node (e.g., eNB, gNB, etc,). The indication instructs the user equipment (UE) to discard protocol data units (PDUs) that are buffered at one or more associated protocol entities at the UE. For example, in some implementations, a UE (e.g., UE 206 of FIG. 2, UE 306 of FIG. 3 UE 406 of FIG. 4, etc.) may receive an indication (also referred to as discard indication) from a gNB (e.g., MgNB 202 or SgNB 204) to discard PDUs buffered at one or more associated protocol entities (e.g., 322, 324, 422, and 424).

At block 520, the user equipment may discard the protocol data units (PDUs) that are buffered at the one or more protocol entities. In some implementations, a UE may discard PDUs buffered at one or more associated protocol entities (e.g., 322, 324, 422, and 424).

Some additional aspects are now described.

Example 1. A method of managing uplink packet duplication at a user equipment (UE), comprising: receiving, by a user equipment (UE), an indication from a gNB, the indication instructing the user equipment (UE) to discard protocol data units (PDUs) that are buffered at one or more associated protocol entities at the user equipment (UE); and discarding, by the user equipment (UE), in response to receiving the indication, the protocol data units (PDUs) that are buffered at the one or more associated protocol entities.

Example 2. According to an example aspect of the method of Example 1, wherein the protocol data units (PDUs) are packet data convergence protocol (PDCP) protocol data units (PDUs).

Example 3. According to an example aspect of the method of Example 2, wherein the discarding includes: flushing the buffered packet data convergence protocol (PDCP) protocol data units (PDUs), or storing the buffered packet data convergence protocol (PDCP) protocol data units (PDUs) for transmission at a later time.

Example 4. According to an example aspect of the method of Example 1, wherein the gNB is a master gNB (MgNB), wherein the indication is received from the master gNB (MgNB), wherein one or more protocol entities include a protocol entity associated with a secondary gNB (SgNB), and wherein the discarding includes discarding protocol data units (PDUs) buffered at the protocol entity associated with the secondary gNB (SgNB).

Example 5. According to an example aspect of the method of Example 1, wherein the gNB is a secondary gNB (SgNB), wherein the indication is received from the secondary gNB (SgNB), wherein one or more protocol entities include a protocol entity associated with a master gNB (MgNB), and wherein the discarding includes discarding protocol data units (PDUs) buffered at the protocol entity associated with the master gNB (MgNB).

Example 6. According to example aspects of the method of Examples 4 or 5, wherein UE is in a dual connectivity (DC) or a carrier aggregation (CA) configuration with the master gNB (MgNB) and the secondary gNB (SgNB) for protocol data unit (PDU) duplication.

Example 7. According to an example aspect of the method of Example 6, wherein the protocol data unit (PDU) duplication is based on new radio (NR) dual connectivity (DC), new radio (NR) carrier aggregation (CA), long term evolution (LTE) dual connectivity, E-UTRA-NR Dual connectivity, or any other form of dual connectivity (DC) or carrier aggregation (CA), as defined in 3GPP standards.

Example 8. According to an example aspect of the method of Example 1, further comprising: determining, upon the receiving, by the user equipment (UE), that protocol data unit (PDU) duplication is activated at the user equipment (UE).

Example 9. According to an example aspect of the method of Example 8, wherein the duplication is activated via a media access control (MAC) control element (CE) or downlink control information (DCI).

Example 10. According to an example aspect of the method of Example 1, wherein the indication is received via downlink control information (DCI).

Example 11. According to an example aspect of the method of Example 10, wherein the downlink control information (DCI) further includes uplink grant information for uplink transmissions from the user equipment (UE) to the first gNB.

Example 12. According to an example aspect of the method of Example 1, wherein a 1:1 mapping exists between protocol data units (PDUs) of packet data convergence protocol (PDCP), radio link control (RLC), and media access control (MAC) and corresponding transport blocks (TBs).

Example 13. According to an example aspect of the method of Example 12, wherein the discarding further includes flushing the packet data convergence protocol (PDCP) protocol data units (PDUs) buffered at the associated RLC protocol entity, which is transmitted in the received uplink grant in the corresponding transport block.

Example 14. According to an example aspect of the method of Example 1, wherein the indication is a first indication including a first value instructing the user equipment (UE) to discard the protocol data units (PDUs) buffered at the one or more associated protocol entities at the user equipment (UE), and further comprising: receiving, by the user equipment (UE), a second indication including a second value, the second indication instructing the user equipment (UE) to transmit protocol data units (PDUs) buffered at the one or more associated protocol entities at the user equipment (UE); and transmitting, by the user equipment (UE), in response to the receiving the second indication with the second value, the protocol data units (PDUs) buffered at the one or more associated protocol entities.

Example 15. According to an example aspect of the method of Example 1, wherein the discarding is performed at a radio link control (RLC) buffer.

Example 16. According to an example aspect of the method of Example 1, wherein the indication is a first indication including a first value instructing the user equipment (UE) to discard the protocol data units (PDUs) buffered at one or more associated protocol entities at the user equipment (UE), and further comprising: wherein the first indication including a second value instructing the user equipment (UE) to transmit protocol data units (PDUs) buffered at one or more associated protocol entities at the user equipment (UE); and transmitting, by the user equipment (UE), in response to the receiving the indication with the second value, the protocol data units (PDUs) buffered at the one or more associated protocol entities.

Example 17. According to an example aspect of the method of Example 1, wherein the indication is a first indication including a first value instructing the user equipment (UE) to discard the protocol data units (PDUs) buffered at one or more associated protocol entities at the user equipment (UE), and further comprising: wherein the first indication including a second value instructing the user equipment (UE) to transmit protocol data units (PDUs) buffered at one or more associated protocol entities at the user equipment (UE); and transmitting, by the user equipment (UE), in response to the receiving the indication with the second value, the protocol data units (PDUs) buffered at the one or more associated protocol entities.

Example 18. An apparatus comprising at least one processor and at least one memory including computer instructions, when executed by the at least one processor, cause the apparatus to perform a method of any of examples 1-17.

Example 19. An apparatus comprising means for performing a method of any of examples 1-17.

Example 20. A non-transitory computer-readable storage medium having stored thereon computer executable program code which, when executed on a computer system, causes the computer system to perform the steps of any of examples 1-17.

Figure 6:
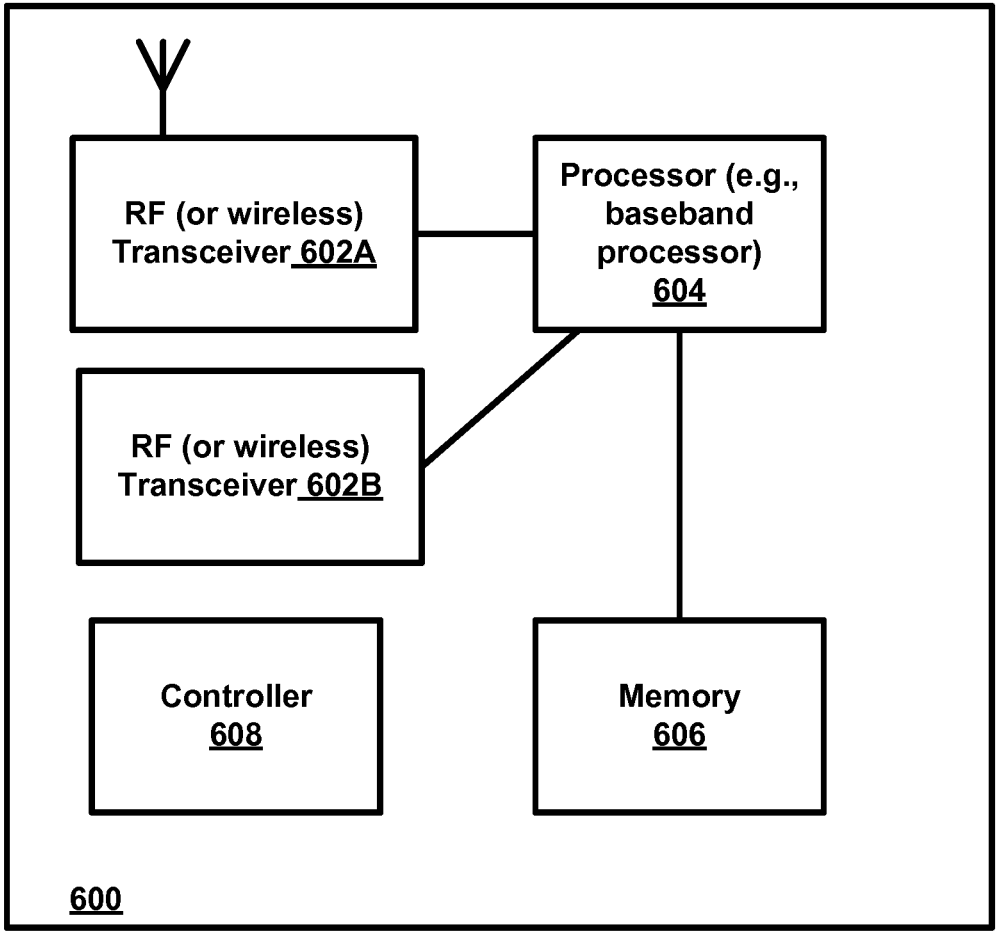
FIG. 6 is a block diagram of a node or wireless station (e.g., base station/access point or mobile station/user device/UE), according to an example implementation.

FIG. 6 is a block diagram of a wireless station (e.g., user equipment (UE)/user device or AP/gNB) 600 according to an example implementation. The wireless station 600 may include, for example, one or two RF (radio frequency) or wireless transceivers 602A, 602B, where each wireless transceiver includes a transmitter to transmit signals and a receiver to receive signals. The wireless station also includes a processor or control unit/entity (controller) 604 to execute instructions or software and control transmission and receptions of signals, and a memory 606 to store data and/or instructions.

Processor 604 may also make decisions or determinations, generate frames, packets or messages for transmission, decode received frames or messages for further processing, and other tasks or functions described herein. Processor 604, which may be a baseband processor, for example, may generate messages, packets, frames or other signals for transmission via wireless transceiver 602 (602A or 602B). Processor 604 may control transmission of signals or messages over a wireless network, and may control the reception of signals or messages, etc., via a wireless network (e.g., after being down-converted by wireless transceiver 602, for example). Processor 604 may be programmable and capable of executing software or other instructions stored in memory or on other computer media to perform the various tasks and functions described above, such as one or more of the tasks or methods described above. Processor 604 may be (or may include), for example, hardware, programmable logic, a programmable processor that executes software or firmware, and/or any combination of these. Using other terminology, processor 604 and transceiver 602 together may be considered as a wireless transmitter/receiver system, for example.

In addition, referring to FIG. 6, a controller (or processor) 608 may execute software and instructions, and may provide overall control for the station 600, and may provide control for other systems not shown in FIG. 6, such as controlling input/output devices (e.g., display, keypad), and/or may execute software for one or more applications that may be provided on wireless station 600, such as, for example, an email program, audio/video applications, a word processor, a Voice over IP application, or other application or software.

In addition, a storage medium may be provided that includes stored instructions, which when executed by a controller or processor may result in the processor 604, or other controller or processor, performing one or more of the functions or tasks described above.

According to another example implementation, RF or wireless transceiver(s) 602A/602B may receive signals or data and/or transmit or send signals or data. Processor 604 (and possibly transceivers 602A/602B) may control the RF or wireless transceiver 602A or 602B to receive, send, broadcast or transmit signals or data.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IoT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semi-conductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

What is claimed is:

1. A method of managing uplink packet duplication at a user equipment (UE), the method comprising:

receiving, by a user equipment (UE), a first indication from a first entity via a media access control (MAC) control element (CE), the first indication instructing the user equipment (UE) to activate protocol data unit (PDU) duplication;

transmitting, by the user equipment (UE), in response to receiving the first indication, protocol data units (PDUs) to the first entity and duplicated protocol data units (PDUs) to a second entity;

receiving, by the user equipment (UE) via a first downlink control information (DCI), a second indication from the first entity or the second entity, the second indication instructing the user equipment (UE) to transmit N protocol data units (PDUs) and discard only N dupli-cated protocol data units (PDUs) that are buffered at the user equipment (UE) while the protocol data unit (PDU) duplication is still activated;

discarding, by the user equipment (UE), in response to receiving the second indication, the N duplicated pro-tocol data units (PDUs);

receiving, by the user equipment (UE), a third indication from the first entity, the third indication instructing the user equipment (UE) to transmit the duplicated proto-col data units (PDUs) buffered at the user equipment (UE) to the second entity and also activating an uplink configured grant for uplink transmissions associated with the second entity, and wherein the third indication is transmitted via a second downlink control informa-tion (DCI); and transmitting, by the user equipment (UE), in response to the receiving the third indication, the duplicated pro-tocol data units (PDUs) to the second entity while sending the protocol data units (PDUs) to the first entity.

2. The method of claim 1, wherein the protocol data units (PDUs) are packet data convergence protocol (PDCP) pro-tocol data units (PDUs).

3. The method of claim 1, wherein the discarding includes:

flushing the duplicated protocol data units (PDUs), or storing the duplicated protocol data units (PDUs) for transmission.

4. The method of claim 1, wherein:

the first entity is a master gNB (MgNB), the first indication is received from the master gNB (MgNB), one or more protocol entities include a protocol entity associated with a secondary gNB (SgNB), the second indication is received from the master gNB (MgNB), transmitting the N protocol data units (PDUs) comprises transmitting the N protocol data units (PDUs) to the first entity, and the discarding includes discarding only N duplicated protocol data units (PDUs) buffered at the protocol entity associated with the secondary gNB (SgNB) while sending the N protocol data units (PDUs) to the master gNB (MgNB).

5. The method of claim 4, wherein the UE is in a dual connectivity (DC) and/or a carrier aggregation (CA) con-figuration with the master gNB (MgNB) and the secondary gNB (SgNB) for protocol data unit (PDU) duplication.

6. The method of claim 5, wherein the protocol data unit (PDU) duplication is based on new radio (NR) dual con-nectivity (DC), new radio (NR) carrier aggregation (CA), long term evolution (LTE) dual connectivity, E-UTRA-NR Dual connectivity, or any other form of dual connectivity (DC) or carrier aggregation (CA), as defined in 3GPP standards.

7. The method of claim 1, wherein:

the second entity is a secondary gNB (SgNB), wherein the second indication is received from the secondary gNB (SgNB), one or more protocol entities include a protocol entity associated with a master gNB (MgNB), and the discarding includes discarding only N duplicated protocol data units (PDUs) buffered at the protocol entity associated with the master gNB (MgNB).

8. The method of claim 1, further comprising:

determining, upon the receiving the first indication, by the user equipment (UE), that protocol data unit (PDU) duplication is activated at the user equipment (UE).

9. The method of claim 8, wherein the duplication is activated via a media access control (MAC) control element (CE) or downlink control information (DCI).

10. The method of claim 1, wherein a 1:1 mapping exists between protocol data units (PDUs) of packet data conver-gence protocol (PDCP), radio link control (RLC), and media access control (MAC) and corresponding transport blocks (TBs).

11. The method of claim 10, wherein the discarding further includes:

flushing the packet data convergence protocol (PDCP) protocol data units (PDUs) buffered at an associated RLC protocol entity, which is transmitted in a received uplink grant in the corresponding transport block.

12. The method of claim 1, wherein the discarding is performed at a radio link control (RLC) buffer.

13. An apparatus comprising:

at least one processor; and at least one memory including computer program code;

the at least one memory and the computer program code, when executed by the at least one processor, configured to cause the apparatus at least to:

receive, by the apparatus, a first indication from a first entity via a media access control (MAC) control element (CE), the first indication instructing the apparatus to activate protocol data unit (PDU) dupli-cation;

transmit, by the apparatus, in response to receiving the first indication, protocol data units (PDUs) to a first entity and duplicated protocol data units (PDUs) to a second entity;

receive, by the apparatus, a second indication from the first entity or the second entity, the second indication instructing the apparatus to transmit N protocol data units (PDUs) and discard only N duplicated protocol data units (PDUs) that are buffered at the apparatus, the second indication being transmitted via a first downlink control information (DCI) while the pro-
tocol data unit (PDU) duplication is still activated;

discard, by the apparatus, in response to receiving the
second indication, the N duplicated protocol data
units (PDUs);

receiving, by the apparatus from the first entity, a third
indication, the third indication instructing the appa-
ratus to transmit the duplicated protocol data units
(PDUs) buffered at the apparatus to the second entity
and activating an uplink configured grant for uplink
transmissions associated with the second entity, and
wherein the third indication is transmitted via a
second downlink control information (DCI); and transmitting, by the apparatus while transmitting pro-
tocol data units (PDUs) to the first entity, in response
to the receiving the third indication, the duplicated
protocol data units (PDUs).

14. The apparatus of claim 13, wherein the computer
program code configured to cause the apparatus to discard
comprises the computer program code configured to cause
the apparatus to:

flush the duplicated protocol data units (PDUs), or store the duplicated protocol data units (PDUs) for trans-
mission.

15. The apparatus of claim 13, wherein:

the first entity is a master gNB (MgNB), the first indication is received from the master gNB
(MgNB), one or more protocol entities include a protocol entity
associated with a secondary gNB (SgNB), the second indication is received from the master gNB
(MgNB), transmitting the N protocol data units (PDUs) comprises
transmitting the N protocol data units (PDUs) to the
first entity, and the computer program code configured to cause the appa-
ratus to discard comprises the computer program code
configured to cause the apparatus to discard only N
protocol data units (PDUs) buffered at the protocol
entity associated with the secondary gNB (SgNB).

16. The apparatus of claim 13, wherein:

the second entity is a secondary gNB (SgNB), the second indication is received from the secondary gNB
(SgNB), one or more protocol entities include a protocol entity
associated with a master gNB (MgNB), and the computer program code configured to cause the appa-
ratus to discard comprises the computer program code
configured to cause the apparatus to discard only N
protocol data units (PDUs) buffered at the protocol
entity associated with the master gNB (MgNB).

17. The apparatus of claim 13, wherein the apparatus is in
a dual connectivity (DC) and/or a carrier aggregation (CA)
configuration with a master gNB (MgNB) and a secondary
gNB (SgNB) for protocol data unit (PDU) duplication.

\* \* \* \* \*